United States Patent
Yoda et al.

(10) Patent No.: US 10,170,970 B2
(45) Date of Patent: Jan. 1, 2019

(54) STEPPER MOTOR

(71) Applicant: SANYO DENKI CO., LTD., Tokyo (JP)

(72) Inventors: Yasushi Yoda, Tokyo (JP); Kouji Nakatake, Tokyo (JP); Masaaki Ohashi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 280 days.

(21) Appl. No.: 14/844,706

(22) Filed: Sep. 3, 2015

(65) Prior Publication Data

US 2016/0079838 A1    Mar. 17, 2016

(30) Foreign Application Priority Data

Sep. 11, 2014  (JP) ................. 2014-185535

(51) Int. Cl.
| | | |
|---|---|---|
| *H02K 37/10* | (2006.01) | |
| *H02K 37/18* | (2006.01) | |
| *H02K 1/27* | (2006.01) | |
| *H02K 3/52* | (2006.01) | |

(52) U.S. Cl.
CPC ............. *H02K 37/10* (2013.01); *H02K 1/27* (2013.01); *H02K 3/52* (2013.01); *H02K 37/18* (2013.01)

(58) Field of Classification Search
CPC ........ H02K 37/00; H02K 37/02; H02K 37/04; H02K 37/10; H02K 37/12; H02K 37/14
USPC ......... 310/49.01, 49.43–49.46, 49.53, 49.54, 310/185, 186
See application file for complete search history.

(56) References Cited

U.S. PATENT DOCUMENTS

| | | | | |
|---|---|---|---|---|
| 4,475,051 A | * | 10/1984 | Chai ............... | H02K 37/04 310/162 |
| 4,647,802 A | * | 3/1987 | Konecny ........ | H02K 19/103 310/162 |
| 4,947,066 A | * | 8/1990 | Ghibu ............. | H02K 37/04 310/269 |
| 4,983,867 A | * | 1/1991 | Sakamoto ....... | H02K 37/18 310/179 |
| 5,545,938 A | | 8/1996 | Mecrow | |

(Continued)

FOREIGN PATENT DOCUMENTS

| | | |
|---|---|---|
| GB | 2262843 A1 | 6/1993 |
| GB | 2338116 A1 | 12/1999 |

(Continued)

OTHER PUBLICATIONS

Extended European Search Report dated Jul. 7, 2016 for the corresponding EP Patent Application No. 15183989.1.

(Continued)

*Primary Examiner* — Jeremy Luks
(74) *Attorney, Agent, or Firm* — Rankin, Hill & Clark LLP

(57) ABSTRACT

A stepper motor includes: a rotor including a rotor core and a permanent magnet, the rotor core including a plurality of teeth; and a stator arranged around the rotor while being spaced apart from the rotor and including a plurality of magnetic pole teeth, the magnetic pole teeth including a plurality of teeth and projecting toward the rotor. A winding is wound around every other magnetic pole tooth. A phase of the teeth of the magnetic pole teeth with no winding therearound is shifted from a phase of the teeth of the other magnetic pole teeth.

3 Claims, 7 Drawing Sheets

(56) References Cited

U.S. PATENT DOCUMENTS

| | | | |
|---|---|---|---|
| 5,760,503 A | 6/1998 | Tsuchida | |
| 5,874,795 A * | 2/1999 | Sakamoto | H02K 37/14 310/156.12 |
| 7,122,933 B2 * | 10/2006 | Horst | H02K 3/18 310/179 |
| 2010/0033048 A1 | 2/2010 | Chang et al. | |
| 2010/0141061 A1 | 6/2010 | Lee | |

FOREIGN PATENT DOCUMENTS

| | | |
|---|---|---|
| JP | 02-266862 | 10/1990 |
| JP | 2000-050610 | 2/2000 |
| JP | 2005-117731 | 4/2005 |
| JP | 2009-060765 | 3/2009 |
| WO | 2008153832 A2 | 12/2008 |

OTHER PUBLICATIONS

Japanese Office Action dated Oct. 17, 2017 for the corresponding Japanese Patent Application No. 2014-185535.

* cited by examiner

| SIGN OF MAGNETIC POLE | | 31h | 31a | 31b | 31c | 31d | 31e | 31f | 31g |
|---|---|---|---|---|---|---|---|---|---|
| ORDER OF EXCITATION | 1 | – | S | – | N | – | S | – | N |
| | 2 | – | S | – | S | – | S | – | S |
| | 3 | – | N | – | S | – | N | – | S |
| | 4 | – | N | – | N | – | N | – | N |

| SIGN OF MAGNETIC POLE | | 231h | 231a | 231b | 231c | 231d | 231e | 231f | 231g |
|---|---|---|---|---|---|---|---|---|---|
| ORDER OF EXCITATION | 1 | S | S | N | N | S | S | N | N |
| | 2 | N | S | S | N | N | S | S | N |
| | 3 | N | N | S | S | N | N | S | S |
| | 4 | S | N | N | S | S | N | N | S |

STEPPER MOTOR

CROSS-REFERENCE TO RELATED APPLICATION

This application claims priority from Japanese Patent Application No. 2014-185535 filed with the Japan Patent Office on Sep. 11, 2014, the entire content of which is hereby incorporated by reference.

BACKGROUND

1. Technical Field

The present disclosure relates to a stepper motor.

2. Description of the Related Art

Stepper motors are typically used as motors for precise positioning control in OA apparatuses and industrial apparatuses.

A stepper motor includes a stator and a rotor. The rotor is rotatably supported on the inner side of the stator. In a hybrid-type stepper motor, windings are wound around magnetic pole teeth of the stator, and a permanent magnet is arranged in the rotor.

In a stepper motor, current flows through the windings. This generates a rotating magnetic field, and rotates the rotor by a predetermined step angle. With a stepper motor, the step angle of rotation is determined by the number of poles of the stator and the rotor.

In a stepper motor, normally, windings are wound around all the magnetic pole teeth of the stator. This results in a large number of coil winding steps. In recent years, various techniques have been proposed in the art relating to a winding structure of a stator of a stepper motor aiming at reducing the number of winding turns of a stepper motor.

For example, JP-A-2009-60765 discloses a synchronous motor, in which a winding is wound around the back yoke for every other slot of the stator. Two teeth together forming a slot where a winding is wound are in phase with each other and of opposite polarities from each other.

JP-A-2000-50610 discloses a permanent magnet-type stepper motor, in which adjacent salient poles of the stator are provided as a pair. These salient poles are integrally linked together by a linking member containing a magnetic material. A single driver winding is wound around the linking member of each pair.

SUMMARY

A stepper motor includes: a rotor including a rotor core and a permanent magnet, the rotor core including a plurality of teeth; and a stator arranged around the rotor while being spaced apart from the rotor and including a plurality of magnetic pole teeth, the magnetic pole teeth including a plurality of teeth and projecting toward the rotor. A winding is wound around every other magnetic pole tooth. A phase of the teeth of the magnetic pole teeth with no winding therearound is shifted from a phase of the teeth of the other magnetic pole teeth.

DESCRIPTION OF THE EMBODIMENTS

Figure 1:
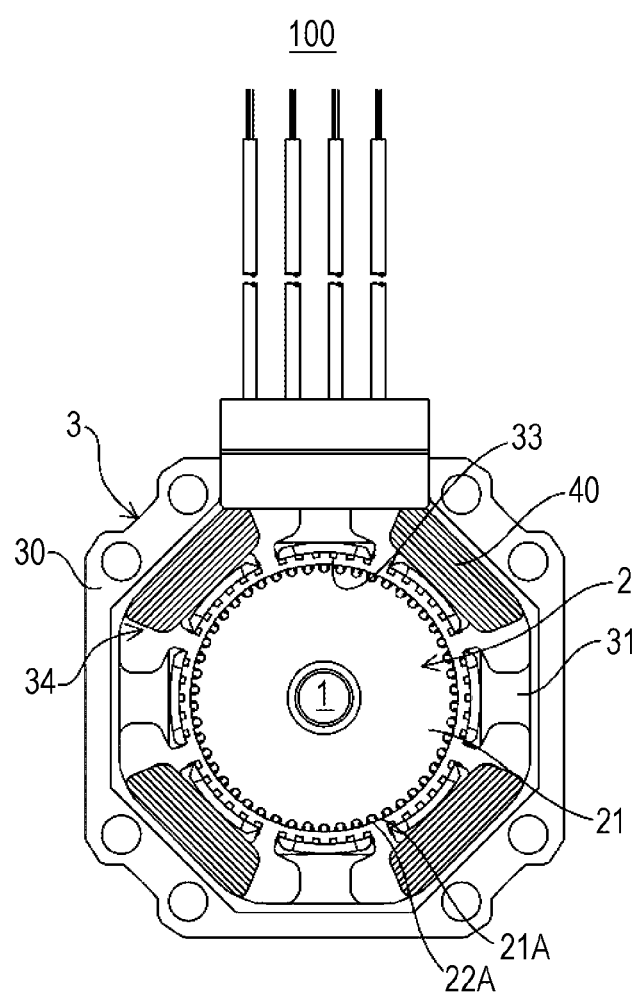
FIG. 1 is a schematic diagram showing a general configuration of a stepper motor of the present embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As described above, in a typical stepper motor, windings are wound around all the magnetic pole teeth of the stator. This results in a large number of coil winding steps. Since windings are wound around all the magnetic pole teeth, there exist adjacent windings. This makes it difficult to efficiently utilize the occupied space of the winding. Moreover, the nozzle of an automatic coil winder is likely to interfere with adjacent windings, thereby possibly damaging the wire coating. Damaged wire coating leads to an insulation failure of the winding.

JP-A-2009-60765 discloses a technique in which windings are wound not around magnetic pole teeth but around the back yoke. This complicates the winding process using an automatic coil winder.

JP-A-2000-50610 discloses a technique in which pairs of salient poles adjacent to each other are linked together by a linking member, with a winding wound around the linking member of each pair. This increases the number of parts, thereby complicating the winding process using an automatic coil winder, as with the technique of JP-A-2009-60765.

An object of the present disclosure is to provide a stepper motor with which it is possible to reduce the number of coil winding steps, to efficiently utilize the occupied space of the winding, thereby compensating for the lowering of the torque, and to prevent or reduce the insulation failure of the winding.

A stepper motor (the present stepper motor) according to one embodiment of the present disclosure includes: a rotor including a rotor core and a permanent magnet, the rotor core including a plurality of teeth; and a stator arranged around the rotor while being spaced apart from the rotor and including a plurality of magnetic pole teeth, the magnetic pole teeth including a plurality of teeth and projecting toward the rotor. A winding is wound around every other magnetic pole tooth. A phase of the teeth of the magnetic pole teeth with no winding therearound is shifted from a phase of the teeth of the other magnetic pole teeth.

According to the present stepper motor, a winding is wound around every other magnetic pole tooth, and it is therefore possible to reduce the number of coil winding steps. Since there exist no adjacent windings, it is possible to efficiently utilize the occupied space of the winding. Therefore, it is possible to compensate for the lowering of the torque due to reducing the number of winding turns. Moreover, the absence of adjacent windings prevents or reduces the damage of the wire coating due to interference with the nozzle of the automatic coil winder. As a result, it is possible to prevent or reduce the insulation failure of the winding.

In addition, the phase of the teeth of magnetic pole teeth with no winding therearound is shifted from the phase of the teeth of the other magnetic pole teeth. Therefore, even though the present stepper motor has a winding structure in which the winding is wound around every other magnetic pole tooth, it is possible to ensure magnetic flux paths.

A stepper motor of the present embodiment will now be described with reference to the drawings.

In the stepper motor of the present embodiment, a winding is wound around every other magnetic pole tooth. Moreover, the phase of the teeth of the magnetic pole teeth with no winding therearound is shifted from the phase of the teeth of the other magnetic pole teeth. Therefore, according to the present embodiment, it is possible to realize a stepper motor with which it is possible to reduce the number of coil winding steps, to efficiently utilize the occupied space of the winding, thereby compensating for the lowering of the torque, and to prevent or reduce the insulation failure of the winding.

[Configuration of Stepper Motor]

Figure 2:
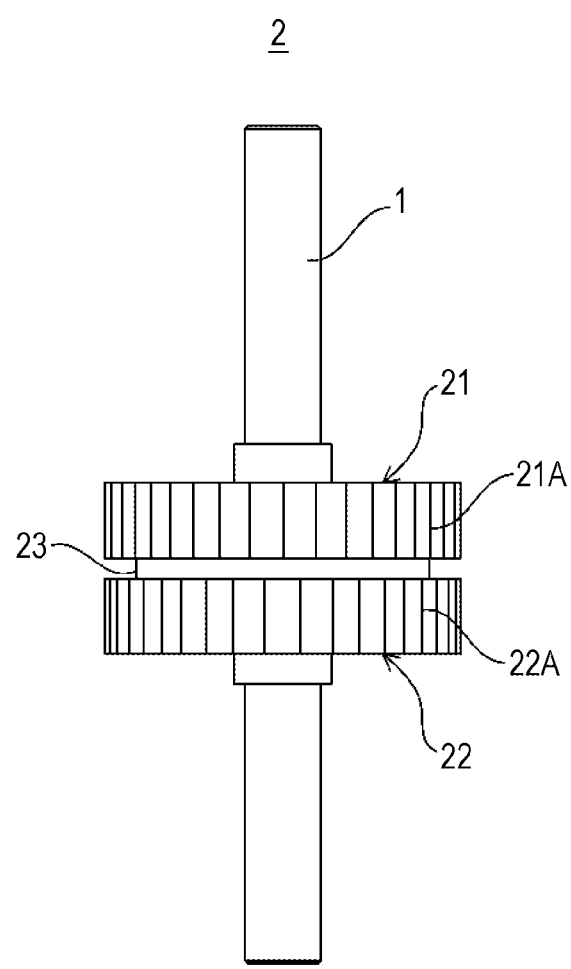
FIG. 2 is a side view showing a rotor of the present embodiment.
Figure 3:
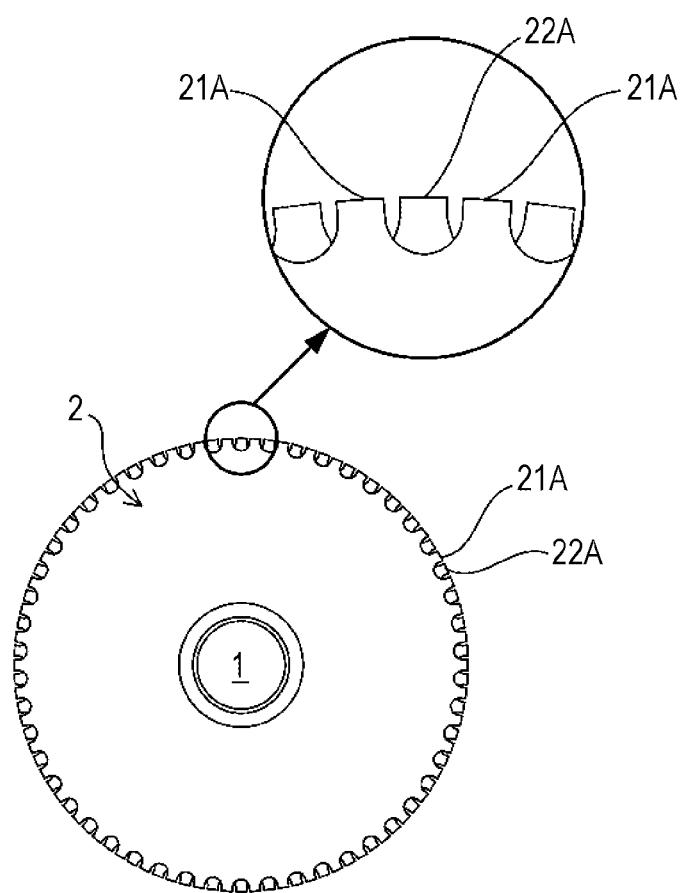
FIG. 3 is a plan view and a partial enlarged view showing the rotor of the present embodiment.
Figure 4:
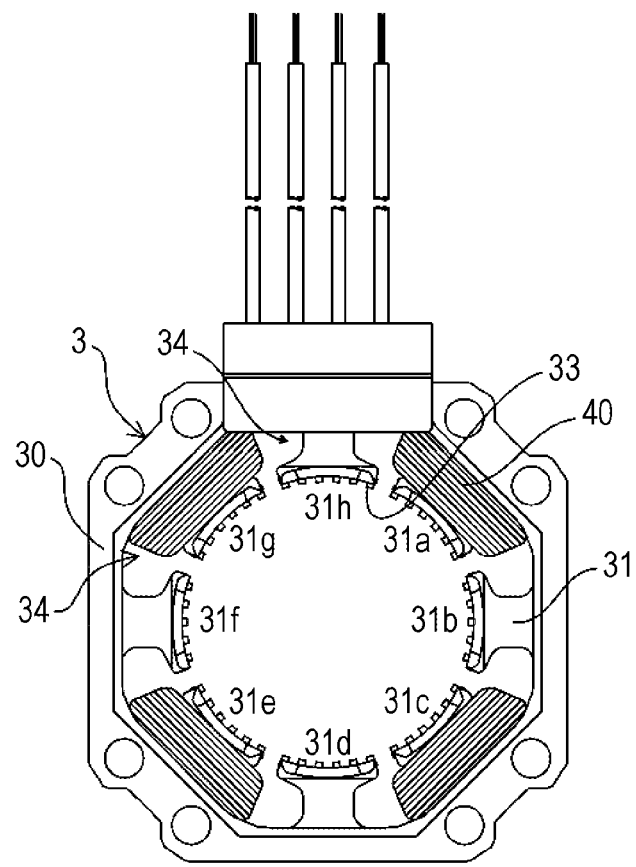
FIG. 4 is a front view showing a stator of the present embodiment.

First, referring to FIGS. 1 to 4, a configuration of the stepper motor of the present embodiment will be described. FIG. 1 is a schematic diagram showing a general configuration of the stepper motor of the present embodiment. FIG. 2 is a side view showing a rotor of the present embodiment. FIG. 3 is a plan view and a partial enlarged view showing the rotor of the present embodiment. FIG. 4 is a front view showing a stator of the present embodiment.

A stepper motor 100 illustrated in FIG. 1 is a 2-phase hybrid-type (HB-type) stepper motor. The stepper motor 100 includes a rotor shaft 1, a rotor 2, and a stator 3. The stator 3 is arranged around the rotor 2 while being spaced apart from the rotor 2.

As shown in FIGS. 1 to 3, the rotor 2 includes a permanent magnet 23, an upper rotor core 21, and a lower rotor core 22. The rotor cores 21 and 22 are provided around the rotor shaft 1 and are stacked on each other. The rotor cores 21 and 22 are each a metal member having a generally thick-walled cylindrical shape provided around the rotor shaft 1. The rotor shaft 1 serves as the center of rotation of the rotor 2.

A plurality of teeth 21A arranged in an external gear configuration is formed on the outer circumference surface of the upper rotor core 21. A plurality of teeth 22A arranged in an external gear configuration is formed on the outer circumference surface of the lower rotor core 22. The teeth 21A and 22A are arranged equi-distantly or generally equi-distantly in the circumferential direction of the rotor cores 21 and 22, respectively. The teeth 21A and 22A are arranged so that the teeth 22A of the lower rotor core 22 are seen through between the teeth 21A of the upper rotor core 21 (see FIG. 3).

For example, a silicon steel plate is used as a material of the rotor cores 21 and 22. Note however that the material of the rotor cores 21 and 22 is not limited to what is disclosed herein.

The permanent magnet 23 is sandwiched between a pair of rotor cores 21 and 22, one above the other, in the axial direction. The permanent magnet 23 is, for example, disc-shaped (see FIG. 2). In the present embodiment, the rotor cores 21 and 22 are magnetized by the permanent magnet 23 so that the upper rotor core 21 is the north pole whereas the lower rotor core 22 is the south pole. Regarding the material of the permanent magnet 23, a rare-earth magnet such as a neodymium magnet may be used, for example. Note however that the material of the permanent magnet 23 is not limited to what is disclosed herein.

As shown in FIGS. 1 and 4, the stator 3 includes a stator core 30, and windings 40.

The stator core 30 is a metal member having a thick-walled cylindrical shape. The inner circumference surface of the stator core 30 has an internal gear configuration. The outer circumference surface of the stator core 30 has a generally octagonal shape. For example, the stator core 30 of the present embodiment has a stack structure including thin plates that are stacked together. Note however that the stator core 30 may have a unit structure, or may include a pressed powder core.

On the inner circumference side of the stator core 30, a plurality of magnetic pole teeth 31 is provided to project toward the rotor 2 (see FIGS. 1 and 4). In the present embodiment, the winding 40 is wound around every other magnetic pole tooth 31. Specifically, the winding 40 is wound around every other magnetic pole tooth 31 (i.e., four magnetic pole teeth 31a, 31c, 31e and 31g) of the eight poles of magnetic pole teeth 31. The base portion of each magnetic pole tooth 31 having the winding 40 therearound becomes a salient north or south pole when a current flows through the winding 40.

A plurality of teeth 33 arranged in a gear configuration is projecting from the inner circumference surface of each magnetic pole tooth 31. In the present embodiment, the phase of the teeth 33 of a pair of magnetic pole teeth 31 (31b and 31l) with no winding 40 therearound is shifted from the phase of the teeth 33 of the other magnetic pole teeth 31 (31d and 31h) with no winding 40 therearound. Specifically, of the four magnetic pole teeth 31 (31b, 31d, 31f and 31h) with no winding 40 therearound, the phase of the teeth 33 of a pair of magnetic pole teeth 31 (31b and 31f) opposing each other is shifted by 180 degrees from the phase of the teeth 33 of the other pair of magnetic pole teeth 31 (31d and 31h). The present disclosure is not limited to this, and the phase of the teeth 33 of a pair of magnetic pole teeth 31 (31d and 31h) opposing each other may be shifted by 180 degrees from the phase of the teeth 33 of another pair of magnetic pole teeth 31 (31b and 31f).

Defined between adjacent magnetic pole teeth 31 and 31 are a plurality of slots 34 extending radially so as to face the rotor 2. Each slot 34 is a space for accommodating the winding 40.

Regarding the material of the stator core 30, a silicon steel plate may be used, for example. Note however that the material of the stator core 30 is not limited to what is disclosed herein.

The winding 40 is wound around every other magnetic pole tooth 31 via an electrical insulating member (not shown), and is arranged in the slot 34. Regarding the material of the electrical insulating member, a synthetic resin such as phenol, nylon and PBT may be used, for example. Note however that the material of the electrical insulating member is not limited to what is disclosed herein.

[Function of Stepper Motor]

Next, the function of the stepper motor of the present embodiment will be described with reference to FIGS. 1 to 7B.

As shown in FIGS. 1 to 4, the stator 3 of the stepper motor 100 of the present embodiment is provided so as to surround the rotor 2 while being spaced apart from the rotor 2. The stator core 30 includes a plurality of magnetic pole teeth 31 provided to project toward the rotor 2.

In the present embodiment, the winding 40 is wound around every other magnetic pole tooth 31. In the stepper motor 100 illustrated in FIG. 1, the winding 40 is wound around every other magnetic pole tooth 31 (i.e., four magnetic pole teeth 31a, 31c, 31e and 31g) of the eight poles of magnetic pole teeth 31. Since the winding 40 is wound around every other magnetic pole tooth 31a, 31c, 31e and 31g, it is possible to reduce the number of coil winding steps. The winding 40 is not wound around the magnetic pole teeth 31b, 31d, 31f and 31h, which are adjacent to the magnetic pole teeth 31a, 31c, 31e and 31g around which the winding 40 is wound.

Therefore, since it is possible to efficiently utilize the occupied space (or the space between the magnetic pole teeth 31) of the winding 40, it is possible to compensate for the lowering of the torque due to reducing the number of winding turns. Moreover, the absence of the winding 40 around the magnetic pole teeth 31b, 31d, 31f and 31h prevents or reduces the damage of the wire coating due to interference with the nozzle of the automatic coil winder. As a result, it is possible to prevent or reduce the insulation failure of the winding 40.

The base portion of each magnetic pole tooth 31 around which the winding 40 is wound becomes a salient north or south pole depending on the direction in which a current flows through the winding 40. That is, the stepper motor 100 of the present embodiment is configured so that a current flows through the windings 40, thereby generating a rotating magnetic field, and rotating the rotor 2 by a predetermined step angle.

For a clear understanding of the function of the stepper motor 100 of the present embodiment, magnetic flux paths of a winding structure of a typical stepper motor 200 will first be described.

Figure 6:
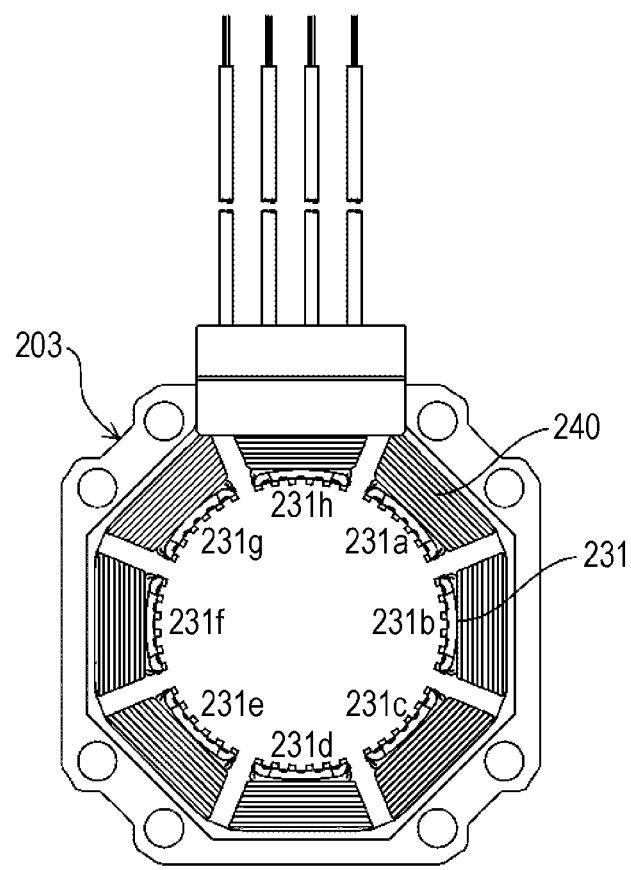
FIG. 6 is a front view showing a stator having a typical winding structure.
Figures 7A, 7B:
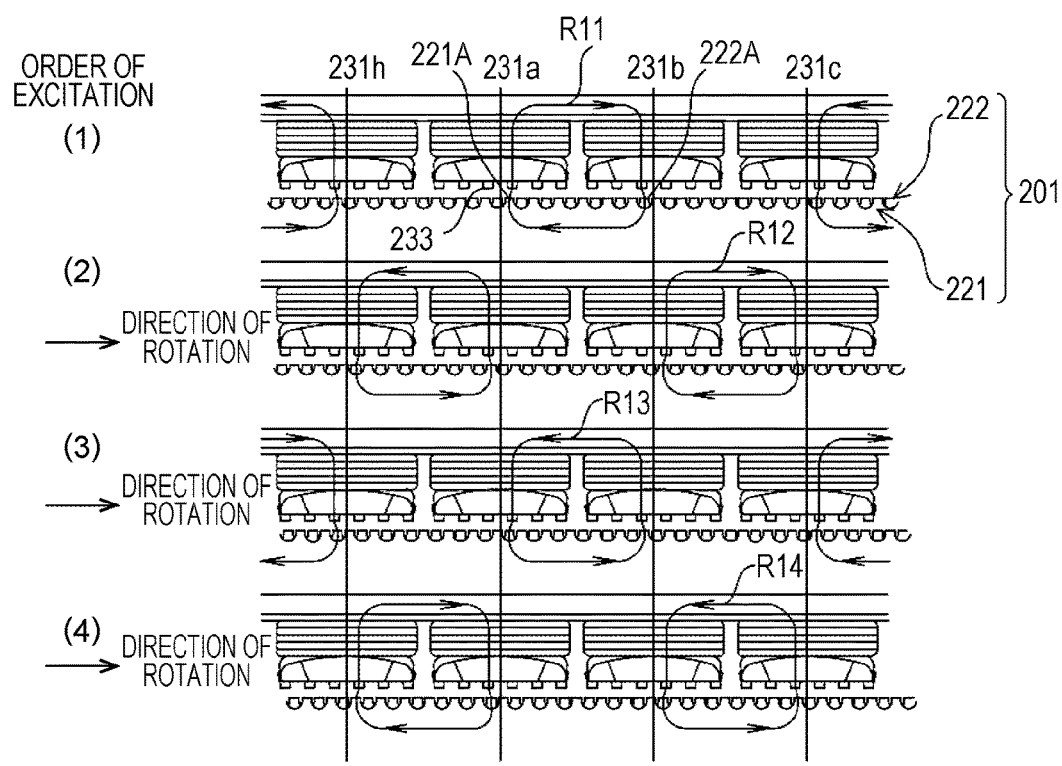
FIG. 7A is a chart used to illustrate magnetic poles generated in the stator of a typical stepper motor.
FIG. 7B is a diagram used to illustrate magnetic flux paths of the typical stepper motor.

Referring to FIGS. 6, 7A, and 7B, magnetic flux paths of the typical stepper motor 200 will be described as a comparative example. FIG. 6 is a front view showing a stator having a typical winding structure. FIG. 7A is a chart used to illustrate magnetic poles generated in the stator of the typical stepper motor. FIG. 7B is a diagram used to illustrate magnetic flux paths of the typical stepper motor. Note that in FIG. 7B, a stator 203 and a rotor 202 of the stepper motor are shown as being unfolded in the direction of rotation.

The stator 203 of the stepper motor 200 of the comparative example shown in FIG. 6 includes eight poles of magnetic pole teeth 231 (231a to 231h). In the stepper motor 200 of the comparative example, windings 240 are wound around all of the eight poles of magnetic pole teeth 231. An upper rotor core 221 is magnetized to be the north pole, and a lower rotor core 222 is magnetized to be the south pole (see FIGS. 7A and 7B).

As shown in FIGS. 6, 7A, and 7B, with the order of excitation (1), a current flows through the windings 240 of the magnetic pole teeth 231h to 231g so that they successively become a salient pole of SS-NN, SS-NN. Within each pair of magnetic pole teeth 231 (231a-231b, 231c-231d, 231e-231f and 231g-231h) where the north pole and the south pole are next to each other, a magnetic flux path R11 is formed extending from a magnetic pole tooth 231 of the north pole to a magnetic pole tooth 231 of the south pole through the rotor 202. Specifically, the magnetic flux path R11 for example extends from a tooth 233 of a magnetic pole tooth 231b of the north pole to a tooth 233 of a magnetic pole tooth 231a of the south pole through a tooth 222A of the lower rotor core 222 and a tooth 221A of the upper rotor core 221.

Next, with the order of excitation (2), a current flows through the windings 240 of the magnetic pole teeth 231h to 231g so that they successively become a salient pole of NS-SN, NS-SN. Within each pair of magnetic pole teeth 231 (231h-231a, 231b-231c, 231d-231e and 231f-231g) where the north pole and the south pole are next to each other, a magnetic flux path R12 is formed extending from a magnetic pole tooth 231 of the north pole to a magnetic pole tooth 231 of the south pole through the rotor 202. Specifically, the magnetic flux path R12 for example extends from a tooth 233 of a magnetic pole tooth 231c of the north pole to a tooth 233 of the magnetic pole tooth 231b of the south pole through a tooth 222A of the lower rotor core 222 and a tooth 221A of the upper rotor core 221.

Next, with the order of excitation (3), a current flows through the windings 240 of the magnetic pole teeth 231h to 231g so that they successively become a salient pole of NN-SS, NN-SS. Within each pair of magnetic pole teeth 231 (231a-231b, 231c-231d, 231e-231f and 231g-231h) where the north pole and the south pole are next to each other, a magnetic flux path R13 is formed extending from a magnetic pole tooth 231 of the north pole to a magnetic pole tooth 231 of the south pole through the rotor 202. Specifically, the magnetic flux path R13 for example extends from a tooth 233 of the magnetic pole tooth 231a of the north pole to a tooth 233 of the magnetic pole tooth 231b of the south pole through a tooth 222A of the lower rotor core 222 and a tooth 221A of the upper rotor core 221.

Next, with the order of excitation (4), a current flows through the windings 240 of the magnetic pole teeth 231h to 231g so that they successively become a salient pole of SN-NS, SN-NS. Within each pair of magnetic pole teeth 231 (231h-231a, 231b-231c, 231d-231e and 231f-231g) where the north pole and the south pole are next to each other, a magnetic flux path R14 is formed extending from a magnetic pole tooth 231 of the north pole to a magnetic pole tooth 231 of the south pole through the rotor 202. Specifically, the magnetic flux path R14 for example extends from a tooth 233 of the magnetic pole tooth 231b of the north pole to a tooth 233 of the magnetic pole tooth 231c of the south pole through a tooth 222A of the lower rotor core 222 and a tooth 221A of the upper rotor core 221.

Figures 5A, 5B:
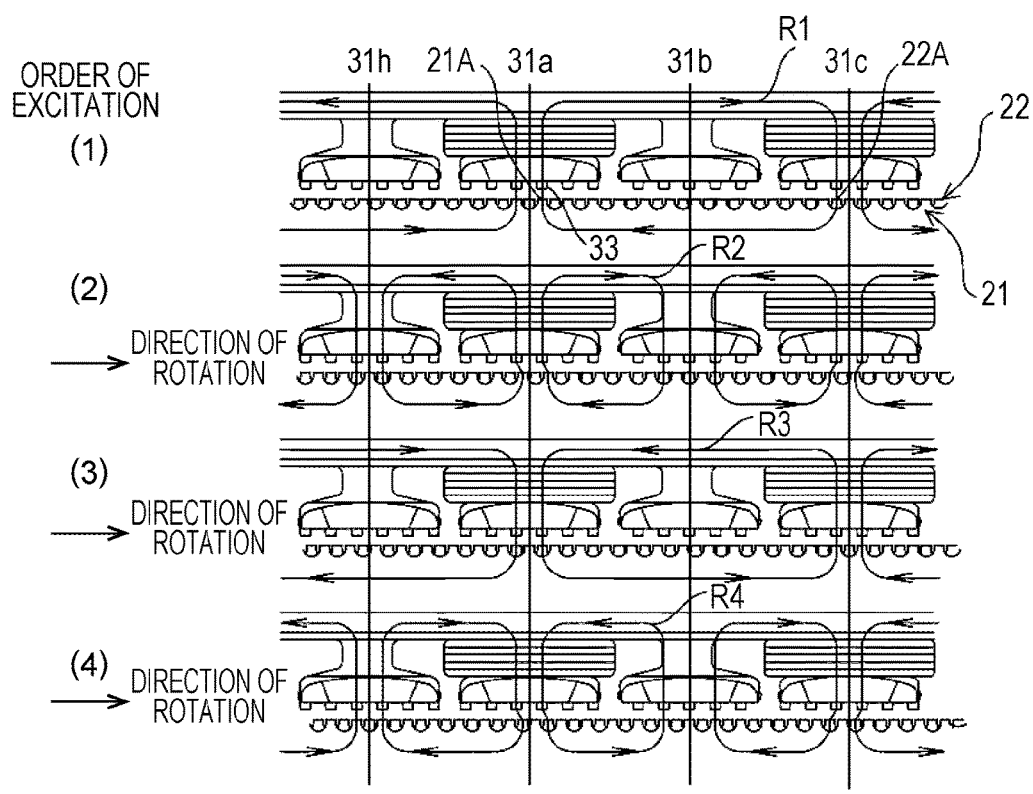
FIG. 5A is a chart used to illustrate magnetic poles generated in the stator of the present embodiment.
FIG. 5B is a diagram used to illustrate magnetic flux paths of the stepper motor of the present embodiment.

Referring to FIGS. 4, 5A, and 5B, magnetic flux paths of the stepper motor 100 of the present embodiment will be described. FIG. 5A is a chart used to illustrate magnetic poles generated in the stator of the present embodiment. FIG. 5B is a diagram used to illustrate magnetic flux paths of the stepper motor of the present embodiment. Note that in FIG. 5B, the stator 3 and the rotor 2 of the stepper motor 100 are shown as being unfolded in the direction of rotation.

The stator 3 of the stepper motor 100 of the present embodiment shown in FIG. 4 includes eight poles of magnetic pole teeth 31. In the stepper motor 100 of the present embodiment, the windings 40 are wound around every other magnetic pole tooth 31 (31a, 31c, 31e and 31g) of eight poles of magnetic pole teeth 31. In the stepper motor 100 of the present embodiment, of the magnetic pole teeth 31b, 31d, 31f and 31h with no winding 40 therearound, the phase of the teeth 33 of the magnetic pole teeth 31b and 31f opposing each other is shifted by 180 degrees from the phase of the teeth 33 of the other magnetic pole teeth 31d and 31h with no winding 40 therearound. Moreover, the upper rotor core 21 is magnetized to be the north pole, and the lower rotor core 22 is magnetized to be the south pole (see FIG. 2).

As shown in FIGS. 4, 5A, and 5B with the order of excitation (1), a current flows through the windings 40 of the magnetic pole teeth 31a, 31c, 31e and 31g having the windings 40 therearound so that they successively become a salient pole of S-N, S-N. The winding 40 is not wound around the magnetic pole teeth 31b, 31d, 31f and 31h. Therefore, for the magnetic pole teeth 31a-31c, 31c-31e, 31e-31g and 31g-31a having the windings 40 therearound, a magnetic flux path R1 is formed extending from a magnetic pole tooth 31 of the north pole to a magnetic pole tooth 31 of the south pole through the rotor 2. Specifically, the magnetic flux path R1 for example extends from a tooth 33 of the magnetic pole tooth 31c of the north pole to a tooth 33 of the magnetic pole tooth 31a of the south pole through a tooth 22A of the lower rotor core 22 and a tooth 21A of the upper rotor core 21.

Next, with the order of excitation (2), a current flows through the windings 40 of the magnetic pole teeth 31a, 31c, 31e and 31g having the windings 40 therearound so that they all become the south pole. As the magnetic pole teeth 31a, 31c, 31e and 31g all become the south pole, the magnetic pole teeth 31b, 31d, 31f and 31h with no winding 40 therearound all become the north pole. Therefore, a magnetic flux path R2 is formed extending from a magnetic pole tooth 31 of the north pole to a magnetic pole tooth 31 of the south pole through the rotor 2. Specifically, the magnetic flux path R2 extends from a tooth 33 of the magnetic pole tooth 31b of the north pole to a tooth 33 of the magnetic pole tooth 31a of the south pole through a tooth 22A of the lower rotor core 22 and a tooth 21A of the upper rotor core 21.

Next, with the order of excitation (3), a current flows through the windings 40 of the magnetic pole teeth 31a, 31c, 31e and 31g having the windings 40 therearound so that they successively become a salient pole of N-S, N-S. The winding 40 is not wound around the magnetic pole teeth 31b, 31d, 31f and 31h. Therefore, for the magnetic pole teeth 31a-31c, 31c-31e, 31e-31g and 31g-31a having the windings 40 therearound, a magnetic flux path R3 is formed extending from a magnetic pole tooth 31 of the north pole to a magnetic pole tooth 31 of the south pole through the rotor 2. Specifically, the magnetic flux path R3 extends from a tooth 33 of the magnetic pole tooth 31a of the north pole to a tooth 33 of the magnetic pole tooth 31c of the south pole through a tooth 22A of the lower rotor core 22 and a tooth 21A of the upper rotor core 21.

Next, with the order of excitation (4), a current flows through the windings 40 of the magnetic pole teeth 31a, 31c, 31e and 31g having the windings 40 therearound so that they all become the north pole. As the magnetic pole teeth 31a, 31c, 31e and 31g all become the north pole, the magnetic pole teeth 31b, 31d, 31f and 31h with no winding 40 therearound all become the south pole. Therefore, a magnetic flux path R4 is formed extending from a magnetic pole tooth 31 of the north pole to a magnetic pole tooth 31 of the south pole through the rotor 2. Specifically, the magnetic flux path R4 extends from a tooth 33 of the magnetic pole tooth 31a of the north pole to a tooth 33 of the magnetic pole tooth 31b of the south pole through a tooth 22A of the lower rotor core 22 and a tooth 21A of the upper rotor core 21.

That is, with the stepper motor 100 of the present embodiment, of the magnetic pole teeth 31b, 31 d, 31f and 31h with no winding 40 therearound, the phase of the teeth 33 of the magnetic pole teeth 31b and 31f opposing each other is shifted by 180 degrees from the phase of the teeth 33 of the other magnetic pole teeth 31d and 31h. Therefore, even though the stepper motor 100 of the present embodiment has a winding structure in which the winding 40 is wound around every other magnetic pole tooth 31a, 31c, 31e and 31g, it is possible to ensure magnetic flux paths.

Preferred embodiments of the present disclosure have been described above. However, the foregoing description is intended only for illustration of the present disclosure, and is not intended to limit the technical scope of the present disclosure to the foregoing embodiments. The technique of the present disclosure can be carried out in various modes different from the foregoing embodiments without deviating from the gist of the present disclosure.

The present embodiment illustrates a 2-phase HB-type stepper motor as an example. However, the technique of the present disclosure is not limited to 2-phase stepper motors, but is applicable to stepper motors of any number of phases.

In the present embodiment, the winding 40 is not wound around the magnetic pole teeth 31b, 31d, 31f and 31h, which are adjacent to the magnetic pole teeth 31a, 31c, 31e and 31g having the windings 40 therearound. Therefore, it is possible to increase the number of winding turns (or the volume of winding) for the magnetic pole teeth 31a, 31c, 31e and 31g.

In the present embodiment, the phase of the teeth 33 of a pair of magnetic pole teeth 31 (31b and 31f) with no winding 40 therearound is shifted from the phase of the teeth 33 of the other magnetic pole teeth 31 (31d and 31h) with no winding 40 therearound. The present disclosure is not limited to this, and the phase of the teeth 33 of the magnetic pole teeth 31 with no winding 40 may be shifted from the phase of the teeth 33 of the other magnetic pole teeth 31 in the present embodiment.

It can be said that the present disclosure relates to a stepper motor with improvements to the structure of the magnetic pole teeth of the stator and the winding structure around the magnetic pole teeth.

The present embodiment may be any of the first to third stepper motors below.

A first stepper motor is a stepper motor including: a rotor including a permanent magnet sandwiched between rotor cores and including a plurality of teeth; and a stator arranged around the rotor while being spaced apart from the rotor, and including a plurality of magnetic pole teeth, the magnetic pole teeth including a plurality of teeth and projecting toward the rotor. A winding is wound around every other magnetic pole tooth, and a phase of the teeth of the magnetic pole teeth with no winding therearound is shifted from that of the teeth of the other magnetic pole teeth.

In a second stepper motor according to the first stepper motor, of the magnetic pole teeth with no winding therearound, a phase of the teeth of a pair of magnetic pole teeth that are opposing each other is shifted by 180 degrees from that of the teeth of the other magnetic pole teeth.

A third stepper motor includes a rotor, and a stator arranged around the rotor while being spaced apart from the rotor. The rotor has a permanent magnet sandwiched between rotor cores, and has a plurality of teeth. The stator includes a plurality of magnetic pole teeth, the magnetic pole teeth including a plurality of teeth and projecting toward the rotor. A winding is wound around every other magnetic pole tooth. A phase of the teeth of the magnetic pole teeth with no winding therearound is shifted from that of the teeth of the other magnetic pole teeth.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A stepper motor comprising:
a rotor including a rotor core and a permanent magnet, the rotor core including a plurality of teeth; and
a stator arranged around the rotor while being spaced apart from the rotor and including eight magnetic poles, each of the magnetic poles including a plurality of teeth and projecting toward the rotor, wherein
a winding is wound around every other magnetic poles, and
a phase of the teeth of a pair of magnetic poles opposing each other and having no winding therearound is shifted by 180 degrees from a phase of the teeth of other pair of magnetic poles opposing each other and having no winding therearound.

2. A stepper motor comprising:
a rotor including a rotor core and a permanent magnet, the rotor core including a plurality of teeth; and
a stator arranged around the rotor while being spaced apart from the rotor and including a plurality of magnetic poles, each of the magnetic poles including a plurality of teeth and projecting toward the rotor, wherein
a winding is wound around every other magnetic poles,
the plurality of magnetic poles comprises a first pair of first and second magnetic poles with no winding therearound and a second pair of third and fourth magnetic poles with no winding therearound, the first and second magnetic poles opposing each other, the third and fourth magnetic poles opposing each other, and
a phase of the teeth of the first pair of the first and second magnetic poles with no winding therearound is shifted by 180 degrees from a phase of the teeth of the second pair of the third and fourth magnetic poles with no winding therearound.

3. A stepper motor comprising:
a rotor having a center of rotation and including a rotor core and a permanent magnet, the rotor core including a plurality of teeth; and
a stator arranged around the rotor while being spaced apart from the rotor and including a plurality of magnetic poles, each of the magnetic poles including a plurality of teeth and projecting toward the rotor, wherein
a winding is wound around every other magnetic poles,
the plurality of magnetic poles comprises a first pair of first and second magnetic poles with no winding therearound and a second pair of third and fourth magnetic poles with no winding therearound,
the first and second magnetic poles are located symmetrically to the center of rotation of the rotor and the third and fourth magnetic poles are located symmetrically to the center of rotation of the rotor, and
a phase of the teeth of the first pair of the first and second magnetic poles with no winding therearound is shifted by 180 degrees from a phase of the teeth of the second pair of the third and fourth magnetic poles with no winding therearound.

* * * * *